United States Patent
Song et al.

(10) Patent No.: US 9,870,710 B2
(45) Date of Patent: Jan. 16, 2018

(54) DRONE CONTROL APPARATUS AND METHOD

(71) Applicant: SAMSUNG SDS CO., LTD., Seoul (KR)

(72) Inventors: Sung-Hak Song, Seoul (KR); Kyu-Ha Choi, Seoul (KR); Jae-Sung Kim, Seoul (KR); Soon-Kyu Park, Seoul (KR); Yun-Ho Jo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 14/994,342

(22) Filed: Jan. 13, 2016

(65) Prior Publication Data

US 2017/0025021 A1   Jan. 26, 2017

(30) Foreign Application Priority Data

Jul. 22, 2015 (KR) .................. 10-2015-0103711

(51) Int. Cl.
*G05D 1/00* (2006.01)
*G08G 5/00* (2006.01)
(Continued)

(52) U.S. Cl.
CPC ........... *G08G 5/0034* (2013.01); *G01C 21/20* (2013.01); *G08G 5/006* (2013.01); *G08G 5/0013* (2013.01);
(Continued)

(58) Field of Classification Search
CPC .... G08G 5/0034; G08G 5/006; G08G 5/0069; G08G 5/045; H04W 4/021; H04W 4/025
(Continued)

(56) References Cited

U.S. PATENT DOCUMENTS

2007/0138345 A1* 6/2007 Shuster .................. G05D 1/105
244/186
2010/0211312 A1* 8/2010 Ginsberg ............... G01C 21/00
701/533
(Continued)

FOREIGN PATENT DOCUMENTS

JP         2014-199548 A    10/2014
KR    10-2009-0011476 A     2/2009

OTHER PUBLICATIONS

Communication dated Apr. 26, 2017, issued by the Korean Intellectual Property Office in corresponding Korean Application No. 10-2015-0103711.

*Primary Examiner* — Muhammad Shafi
(74) *Attorney, Agent, or Firm* — Sughrue Mion, PLLC

(57) ABSTRACT

A drone control apparatus and method are disclosed. The drone control apparatus according to an exemplary embodiment of the present disclosure includes a communication unit that communicates with a drone operation system and a drone over a wireless communication network, a storage unit that stores radio wave environment information of the wireless communication network according to a spatial position, and flight restriction information, and a determination unit that determines a flight path and a flight altitude of the drone based on a radio map, the flight restriction information, and a departure and a destination of the drone received from the drone operation system, and transmits the flight path and the flight altitude to at least one of the drone and the drone operation system via the communication unit.

11 Claims, 8 Drawing Sheets

(51) Int. Cl.
*H04W 4/02* (2009.01)
*G01C 21/20* (2006.01)
*H04L 12/26* (2006.01)

(52) U.S. Cl.
CPC ......... *G08G 5/0039* (2013.01); *G08G 5/0052* (2013.01); *G08G 5/0069* (2013.01); *H04W 4/021* (2013.01); *H04W 4/025* (2013.01); *H04L 43/16* (2013.01)

(58) Field of Classification Search
USPC .......................................................... 701/3
See application file for complete search history.

(56) References Cited

U.S. PATENT DOCUMENTS

| 2014/0303884 A1* | 10/2014 | Levien | G08G 5/04 |
| | | | 701/301 |
| 2016/0012393 A1* | 1/2016 | Wang | G06Q 10/08355 |
| | | | 705/338 |
| 2016/0327945 A1* | 11/2016 | Davidson | G05D 1/0027 |

* cited by examiner

DRONE CONTROL APPARATUS AND METHOD

CROSS-REFERENCE TO RELATED APPLICATION

This application claims priority to and the benefit of Korean Patent Application No. 10-2015-0103711, filed on Jul. 22, 2015, the disclosure of which is incorporated herein by reference in its entirety.

BACKGROUND

1. Field

Exemplary embodiments of the present disclosure relate to a drone control technology.

2. Discussion of Related Art

Drones are flying bodies that fly through remote control without a person boarding or fly autonomously along a designated path. Drones have been utilized mainly for military purpose. In recent years, drones have been utilized in various fields such as the transportation field or the security field, and for personal purpose.

A range of utilization of drones is gradually widened as above. However, individual control of drones has been made mainly by individuals or drone operators. Accordingly, several problems have occurred, for example, in that drones intrude in public controlled zones or private controlled zones or collide with buildings.

SUMMARY

Exemplary embodiments of the present disclosure provide a drone control system and method.

A drone control apparatus according to an exemplary embodiment of the present disclosure includes: a communication unit that communicates with a drone operation system and a drone over a wireless communication network; a storage unit that stores radio wave environment information of the wireless communication network according to a spatial position, and flight restriction information; and a determination unit that determines a flight path and a flight altitude of the drone based on the radio wave environment information, the flight restriction information, and a departure and a destination of the drone received from the drone operation system, and transmits the flight path and the flight altitude to at least one of the drone and the drone operation system via the communication unit.

The flight restriction information may include information on at least one of a flight restricted area in which flight of the drone is restricted or prohibited and a function restricted area in which it is necessary to restrict functions of the drone.

The path determination unit may determine the flight path and the flight altitude so that the drone passes through an area and an altitude at which a radio wave environment satisfying a preset standard is provided based on the radio wave environment information, the flight path and the flight altitude being determined so that the drone avoids the flight restricted area.

The path determination unit may update the radio wave environment information based on position information and signal quality information of the wireless communication network received from the flying drone.

The drone control apparatus may further include: a control unit that generates control information for the flying drone based on the position information received from the flying drone and the flight restriction information, and transmits the generated control information to at least one of the flying drone and the drone operation system via the communication unit.

The control unit may generate a warning signal for warning of approach or entrance to the flight restricted area and transmit the warning signal to the drone operation system when the flying drone approaches or enters the flight restricted area based on the position information and the flight restriction information.

The control unit may generate a control signal for changing at least one of a flight direction and a flight altitude of the flying drone when the flying drone approaches or enters the flight restricted area based on the position information, and transmit the control signal to the flying drone.

The control unit may generate a control signal for blocking functions of the flying drone and transmits the control signal to the flying drone when the flying drone approaches or enters the function restricted area based on the position information.

A drone control method using a wireless communication network according to another exemplary embodiment of the present disclosure includes: receiving information on a departure and a destination of a drone received from a drone operation system; determining a flight path and a flight altitude of the drone based on the information on a departure and a destination, prestored radio wave environment information of the wireless communication network according to a spatial position, and prestored flight restriction information; and transmitting the flight path and the flight altitude to at least one of the drone and the drone operation system.

The flight restriction information may include information on at least one of a flight restricted area in which flight of the drone is restricted or prohibited and a function restricted area in which it is necessary to restrict functions of the drone.

The determining may include determining the flight path and the flight altitude so that the drone passes through an area and an altitude at which a radio wave environment satisfying a preset standard is provided based on the radio wave environment information, the flight path and the flight altitude being determined so that the drone avoids the flight restricted area.

The drone control method may further include: receiving position information and signal quality information of the wireless communication network from the flying drone; and updating the radio wave environment information based on the position information and the signal quality information.

The drone control method may further include: receiving position information from the flying drone; generating control information for the flying drone based on the position information and the flight restriction information; and transmitting the control information to at least one of the flying drone and the drone operation system.

The generating may include generating a warning signal for warning of approach or entrance to the flight restricted area when the flying drone approaches or enters the flight restricted area based on the position information and the flight restriction information.

The generating may include generating a control signal for changing at least one of a flight direction and a flight altitude of the flying drone when the flying drone approaches or enters the flight restricted area based on the position information.

The generating may include generating a control signal for blocking functions of the flying drone when the flying drone approaches or enters the function restricted area based on the position information.

A computer program stored in a recording medium according to still another exemplary embodiment of the present disclosure executes, in combination with hardware, the operations of: receiving information on a departure and a destination of a drone from a drone operation system; determining a flight path and a flight altitude of the drone based on the information on a departure and a destination, prestored radio wave environment information of a wireless communication network according to a spatial position, and prestored flight restriction information; and transmitting the flight path and the flight altitude to at least one of the drone and the drone operation system.

According to exemplary embodiments of the present disclosure, it is possible to widen a control range of the drone and reduce cost for building a communication network for drone control by enabling the drone to be controlled using a previously built wireless communication network.

Further, according to exemplary embodiments of the present disclosure, it is possible to prevent risk from occurring due to restricted area intrusion or collision of the drone by determining the flight path and altitude of the drone according to the radio wave environment of the wireless communication network and the flight restriction information of the drone and providing the flight path and altitude.

DETAILED DESCRIPTION OF EXEMPLARY EMBODIMENTS

Hereinafter, specific exemplary embodiments of the present disclosure will be described with reference to the drawings. The following detailed description is provided to assist in comprehensive understanding of methods, apparatuses, and/or systems described herein. However, this is merely an example, and the present disclosure is not limited thereto.

When detailed description of known art related to the present disclosure is determined to unnecessarily obscure the subject matter of the present disclosure in describing exemplary embodiments of the present disclosure, the detailed description will be omitted. The terms to be described below are terms defined in consideration of functions in the present disclosure and may be changed according to an intention of a user or an operator or practice. Therefore, definitions thereof will be determined based on content of the entire specification. The terms used in the detailed description are merely intended to describe the exemplary embodiments of the present disclosure and should not be limited in any way. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, operations, operations, elements, and/or components, but do not preclude the presence or addition of one or more other features, integers, operations, operations, elements, components, and/or groups thereof.

Figure 1:
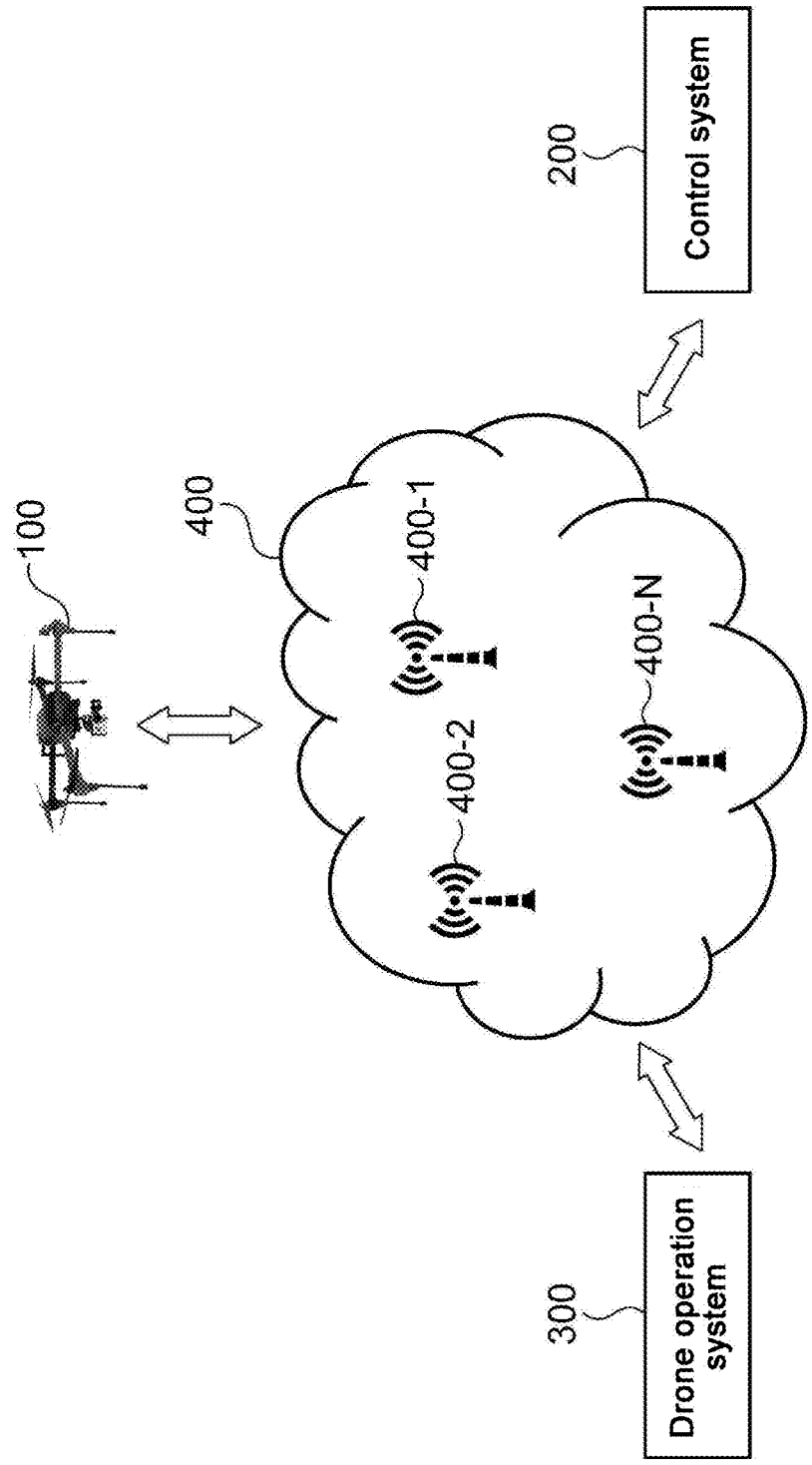
FIG. 1 is a configuration diagram of a drone control service providing system according to an exemplary embodiment of the present disclosure.

FIG. 1 is a configuration diagram of a drone control service providing system according to an exemplary embodiment of the present disclosure.

Referring to FIG. 1, a drone control service providing system 10 according to an exemplary embodiment of the present disclosure may include a drone 100, a control system 200, a drone operation system 300, and a wireless communication network 400.

The drone 100 is a flying body that flies through remote control without a person boarding or flies autonomously along a designated path. The drone may also be referred to as an unmanned aerial vehicle (UAV). The drone may include any type of flying body that can fly through remote control without a person boarding or fly autonomously along a designated path, and is not limited to a specific name and type.

Meanwhile, the drone 100 may be operated for several purposes such as military, transportation, and security. According to the purposes, various sensors such as a camera, an infrared sensor, a thermal sensor, and a position measurement sensor (for example, a GPS receiver) can be mounted on the drone.

In an exemplary embodiment of the present disclosure, the drone 100 can communicate with the drone operation system 300 and the control system 200 over the wireless communication network 400. Specifically, the drone 100 may change a flight path and a flight altitude or control the operation of a sensor (for example, a camera) according to a control signal received from the drone operation system 300.

Further, according to an exemplary embodiment, the drone 100 may receive a control signal from the control system 200 over the wireless communication network 400 and change the flight path and the flight altitude or control the operation of a sensor (for example, a camera). In this case, the control signal may include, for example, a flight path and a flight altitude, flight restriction information, and a control signal for controlling the operation of the drone 100. For example, when the drone 100 autonomously flies, the drone 100 may receive the flight path and the flight altitude from the control system 200 and fly according to the received flight path and the received flight altitude.

The control system 200 is intended to control the flight of the drone 100. The control system 200 may perform registration and authentication of the drone 100 according to a registration and authentication request for the drone 100 from an operator of the drone operation system 300, and may provide control information to at least one of the drone 100 and the drone operation system 300 over the wireless communication network 400.

The drone operation system 300 is a system that directly operates the drone 100, and may be operated by a variety of subjects, such as an individual or a business. The drone operation system 300 may include, for example, a control terminal for controlling the drone 100. In this case, an operator may directly control the drone 100 or control functions of the drone 100 using the control terminal, and a control signal generated according to an operation of the control terminal by the operator may be transmitted to the drone 100 over the wireless communication network 400.

The wireless communication network 400 may relay communication between the drone 100, the control system 200, and the drone operation system 300. Specifically, the drone 100 may connect to one of base stations 400-1, 400-2, and 400-N of the wireless communication network 400 to communicate with the control system 200 and the drone operation system 300. Therefore, the operator of the drone operation system 300 may subscribe to a wireless communication service of a wireless communication provider that operates the wireless communication network 400 and register the drone 100 that is desired to be operated.

Meanwhile, the wireless communication network 400 is a communication network operated by the wireless communication provider. The wireless communication network 400 may be, for example, a mobile communication network of a wideband code division multiple access (WCDMA) scheme or a long term evolution (LTE) scheme, but is not necessarily limited thereto and may include networks of different schemes that provide a wireless communication service to a wireless communication terminal using a plurality of base stations.

Meanwhile, while one drone 100 controlled by the control system 200 has been shown in the example illustrated in FIG. 1, this is an example for convenience of description, and the control system 200 can control one or more drones 100 and a drone operation system can operate one or more drones 100, unlike the illustrated example.

Figure 2:
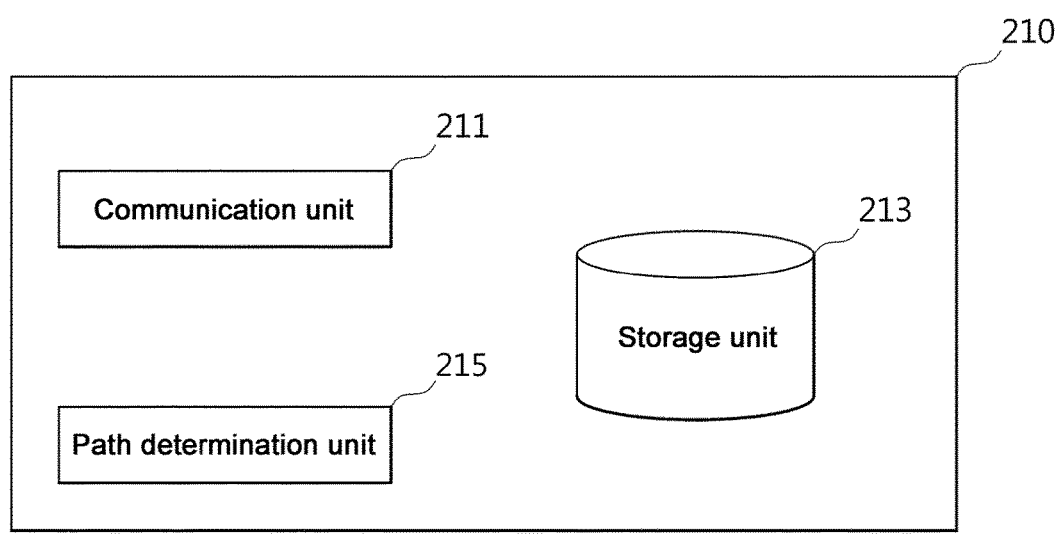
FIG. 2 is a configuration diagram of a drone control apparatus according to an exemplary embodiment of the present disclosure.

FIG. 2 is a configuration diagram of a drone control apparatus 210 according to an exemplary embodiment of the present disclosure.

Referring to FIG. 2, the drone control apparatus 210 according to an exemplary embodiment of the present disclosure includes a communication unit 211, a storage unit 213, and a path determination unit 215.

The drone control apparatus 210 illustrated in FIG. 2 may be included, for example, as one constituent of the control system 200 illustrated in FIG. 1.

The communication unit 211 transmits and receives data to and from the drone operation system 300 and the drone 100 operated by the drone operation system 300 over the wireless communication network 400.

The storage unit 213 stores radio wave environment information of the wireless communication network 400 and flight restriction information according to a spatial position. In this case, the spatial position may refer to, for example, a position on a three-dimensional space such as latitude, longitude, and altitude. Further, the radio wave environment information may include, for example, a variety of parameters indicating quality of a signal transmitted from the base stations 400-1, 400-2, and 400-N of the wireless communication network 400, such as a received signal intensity indicator (RSSI), a signal to noise ratio (SNR), and a signal to interference plus ratio (SINR).

Meanwhile, the radio wave environment information of the wireless communication network 400 according to the spatial position according to an exemplary embodiment of the present disclosure may be implemented, for example, as a radio map.

Meanwhile, the flight restriction information may include information on an area in which it is necessary to control flight or functions of the drone 100. For example, the flight restriction information may include information on at least one of a flight restricted area in which flight of the drone is restricted or prohibited and a function restricted area in which it is necessary to restrict functions of the drone.

In a specific example, the flight restricted area may include, for example, an area in which flight is legally prohibited, such as a military area, an area in which a flight altitude is restricted to be equal to or higher than a certain altitude or equal to or lower than the certain altitude, an area in which there is an obstacle with which the drone is likely to collide, such as a skyscraper, and an area in which flight should be authorized in advance. Further, the function restricted area may include, for example, an area in which photography is prohibited.

Meanwhile, the flight restriction information is not limited to the above-described examples and may be variously set and changed by an operator of the control system. Further, according to an exemplary embodiment, the flight restriction information may be implemented by a Geo-fence.

The path determination unit 215 may determine the flight path and the flight altitude of the drone based on information on a departure and a destination received from the drone operation system 300, and the radio wave environment information of the wireless communication network 400 and the flight restriction information stored in the storage unit 213, and transmit the flight path and the flight altitude to at least one of the drone 100 and the drone operation system 300 via the communication unit 211.

According to an exemplary embodiment of the present disclosure, the path determination unit 215 may determine the flight path and the flight altitude between the departure and the destination so that the drone passes through an area and an altitude at which a radio wave environment satisfying a preset standard is provided based on the radio wave environment information of the wireless communication network 400 stored in the storage unit 213, and avoids the flight restricted area in which the flight of the drone 100 is restricted or prohibited based on the flight restriction information.

For example, the path determination unit 215 may determine the flight path and the flight altitude between the departure and the destination on a shortest path in an area other than the area in which the flight of the drone 100 is restricted or prohibited, a radio wave shaded area, or an area in which interference or noise is severe.

In another example, the path determination unit 215 may determine the flight path and the flight altitude between the departure and the destination on a path in which signal quality of the wireless communication network 400 is best in the area other than the area in which the flight of the drone 100 is restricted or prohibited.

Meanwhile, according to an exemplary embodiment of the present disclosure, the path determination unit 215 may determine the flight path of the drone 100 in consideration of flight paths of other drones.

Specifically, when flight paths and flight altitudes overlap or intersect one another among a plurality of drones, collision is likely to occur. Accordingly, the path determination unit 215 may determine a flight path and a flight altitude of the drone 100 in consideration of previously determined flight paths and flight altitudes of other drones.

For example, the path determination unit 215 may determine the flight path of the drone 100 to overlap or intersect the flight path of the other drone, and determine the flight altitude of the drone 100 to fly at an altitude different from that of the other drone in a section in which the flight paths overlap or intersect each other.

Meanwhile, according to an exemplary embodiment of the present disclosure, the path determination unit 215 may update the radio wave environment information of the wireless communication network 400 stored in the storage unit 213 based on the position information received from the flying drone 100 and the signal quality information of the wireless communication network 400.

Specifically, the flying drone 100 may measure quality of a signal received from the base station 400-1, 400-2, or 400-N of the wireless communication network 400 to which the flying drone 100 connects, and a current position, and transmit information on the measured current position and the measured signal quality to the drone control apparatus 210 via the base station 400-1, 400-2, or 400-N to which the flying drone 100 connects. In this case, the current position measured by the flying drone 100 may refer to, for example, a position on a three-dimensional space, such as a latitude, a longitude, and an altitude.

Based on the position information received from the flying drone 100 via the communication unit 211 and the signal quality information of the wireless communication network 400, the path determination unit 215 may update radio wave environment information for an area corresponding to the received position information in the radio wave environment information of the wireless communication network 400 stored in the storage unit 213.

Figure 3:
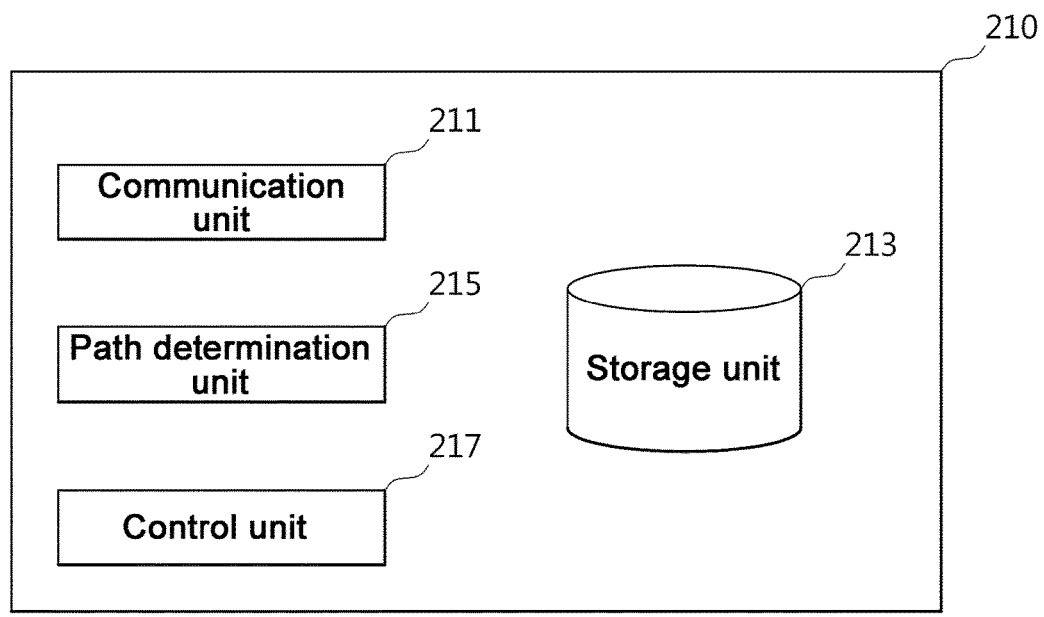
FIG. 3 is a configuration diagram of the drone control apparatus according to another exemplary embodiment of the present disclosure.

FIG. 3 is a block diagram of a drone control apparatus according to another exemplary embodiment of the present disclosure.

Referring to FIG. 3, a drone control apparatus 210 according to another exemplary embodiment of the present disclosure includes a communication unit 211, a storage unit 213, a path determination unit 215, and a control unit 217.

Meanwhile, since the communication unit 211, the storage unit 213, and the path determination unit 215 illustrated in FIG. 3 have the same configurations as those illustrated in FIG. 2, detailed description thereof will be omitted.

The control unit 217 may generate control information for the flying drone 100 based on the position information received from the flying drone 100 and the flight restriction information stored in the storage unit 213.

In this case, the control information may include, for example, at least one of a warning signal for warning of approach or entrance to the flight restricted area and a control signal for controlling the drone 100 when the drone approaches or enters the flight restricted area or the function restricted area.

Specifically, according to an exemplary embodiment of the present disclosure, the control unit 217 may generate a warning signal and transmit the warning signal to the drone operation system 300 via the communication unit 211 when the flying drone 100 approaches or enters the flight restricted area based on the position information received from the flying drone 100 and the flight restriction information stored in the storage unit 213.

For example, when the drone 100 flies under the control of the drone operation system 300, the drone 100 may approach or enter the flight restricted area. Therefore, when the flying drone 100 approaches an area within a certain distance from the flight restricted area or enters the flight restricted area, the control unit 217 transmits a warning signal to inform that the drone 100 approaches or enters the flight restricted area to the drone operation system 300 such that the drone 100 can avoid or leave from the flight restricted area.

Meanwhile, according to an exemplary embodiment of the present disclosure, based on the position information received from the flying drone 100 and the flight restriction information stored in the storage unit 213, the control unit 217 may generate a control signal for controlling the drone 100 and transmit the control signal to the drone 100 via the communication unit 211 when the flying drone 100 approaches or enters the flight restricted area.

For example, when the flying drone 100 enters the function restricted zone, the control unit 217 may transmit a control signal for blocking functions of the drone 100 to the drone 100. In a more specific example, when the flying drone 100 enters a photography prohibited area, the control unit 217 may generate a control signal for blocking an operation of a camera included in the drone 100 and transmit the control signal to the drone 100.

In another example, when the flying drone 100 approaches an area within a certain distance from the flight restricted area or enters the flight restricted area, the control unit 217 may transmit a control signal for controlling the flight path or the flight altitude of the drone 100 to the drone 100. In a more specific example, when the drone 100 approaches an area within a certain distance from an obstacle such as a building at an altitude lower than the obstacle, the control unit 217 generates a control signal for changing a flight direction or a flight altitude of the drone 100 and transmit the control signal to the drone 100 to prevent collision.

Meanwhile, in an exemplary embodiment, the communication unit 211, the storage unit 213, the path determination unit 215, and the control unit 217 illustrated in FIGS. 2 and 3 may be implemented on one or more computing devices including one or more processors, and a computer-readable recording medium connected to the processor. The computer-readable recording medium may be arranged inside or outside the processor and connected to the processor by a variety of well-known means. The processor in the computing device can enable the computing device to operate according to the exemplary embodiments described herein. For example, the processor can execute instructions stored in the computer-readable recording medium, and when the instructions stored in the computer-readable recording medium are executed by the processor, the instructions enable the computing device to perform operations according to the exemplary embodiments described herein.

Figure 4:
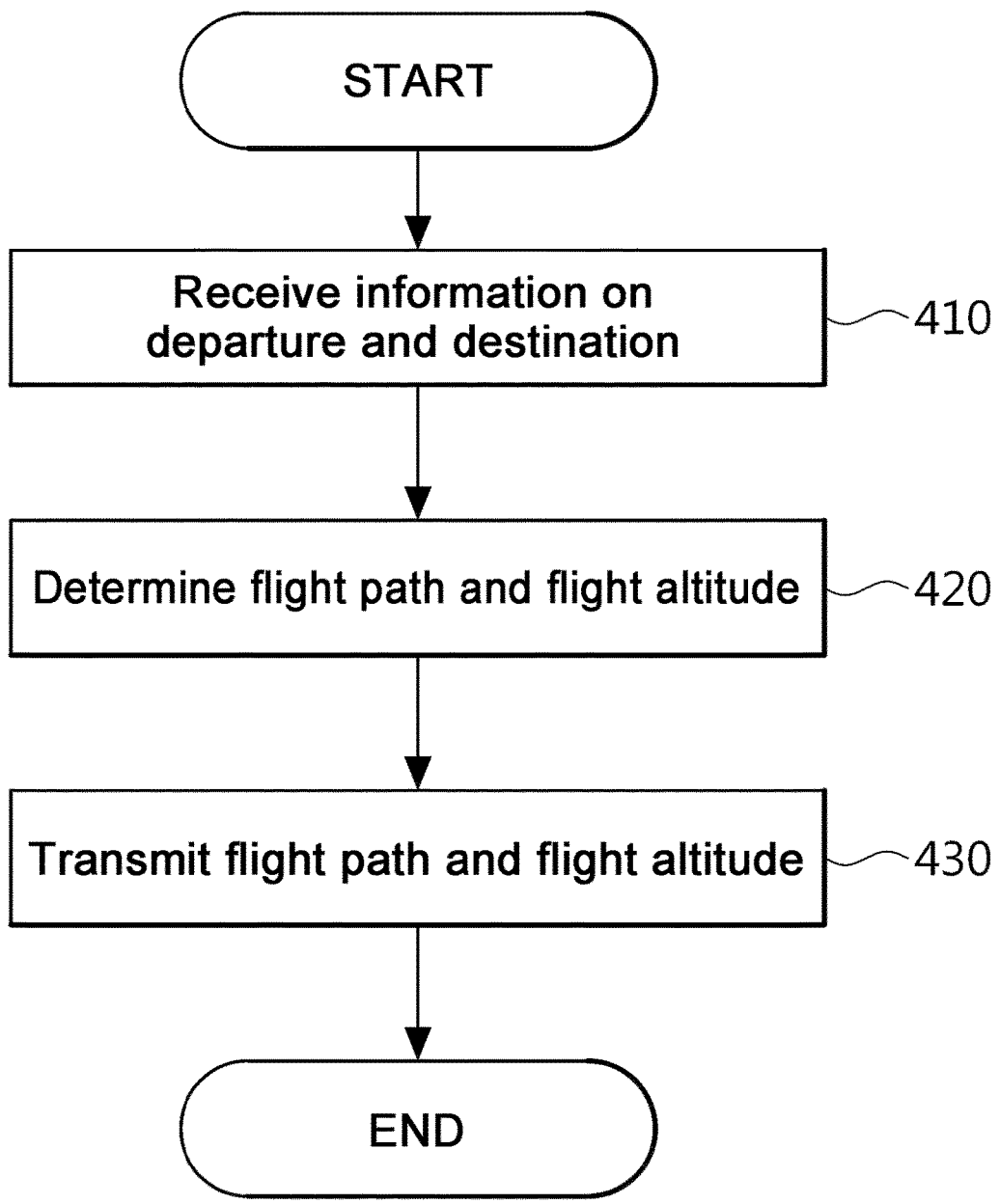
FIG. 4 is a flowchart illustrating a procedure of determining a flight path and a flight altitude according to an exemplary embodiment of the present disclosure.

FIG. 4 is a flowchart illustrating a procedure of determining a flight path and a flight altitude according to an exemplary embodiment of the present disclosure.

A method illustrated in FIG. 4 may be performed by, for example, the drone control apparatus 210 illustrated in FIGS. 2 and 3.

Referring to FIG. 4, the drone control apparatus 210 receives information on a departure and a destination of a drone to be operated from the drone operation system 300 (410).

Then, the drone control apparatus 210 determines a flight path and a flight altitude of the drone based on the received information on the departure and the destination, the radio wave environment information of the wireless communication network 400 according to the spatial position, and the flight restriction information (420).

Then, the drone control apparatus 210 transmits the determined flight path and the determined flight altitude to at least one of the drone operation system 300 and the drone 100 (430).

Figure 5:
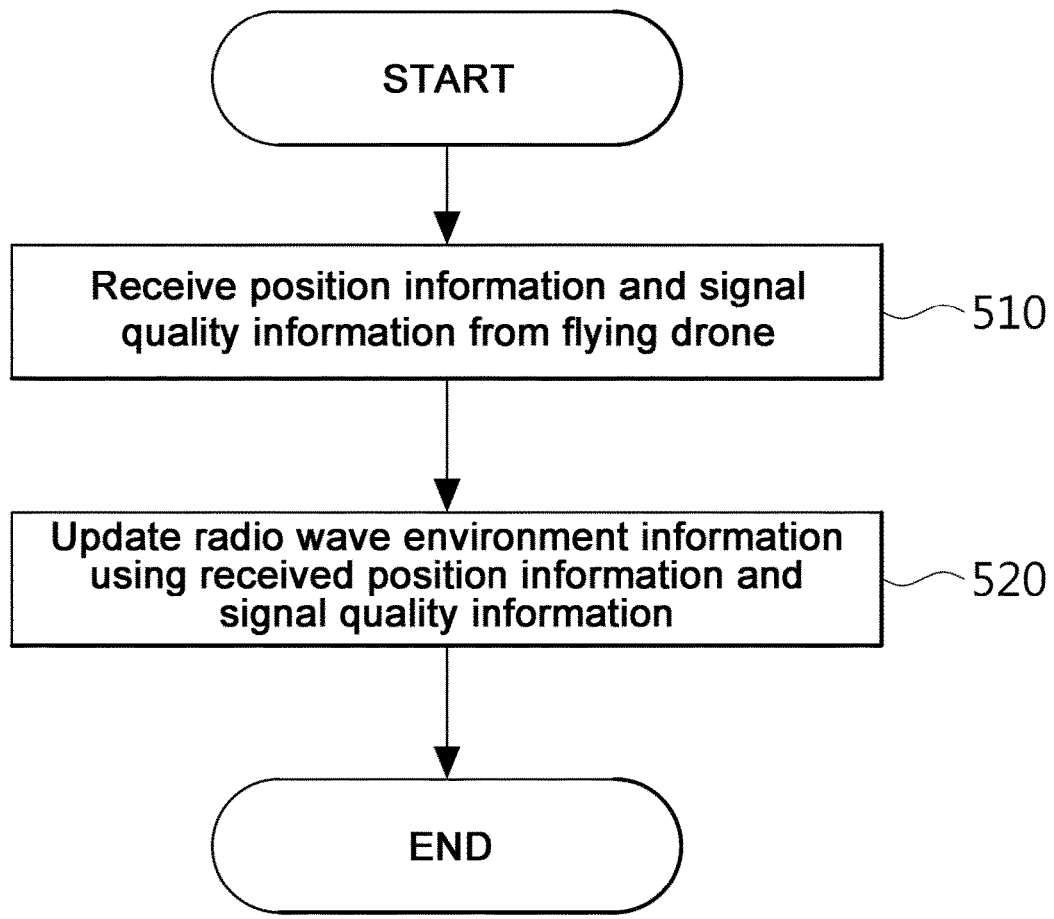
FIG. 5 is a flowchart illustrating a procedure of updating radio wave environment information according to an exemplary embodiment of the present disclosure.

FIG. 5 is a flowchart illustrating a procedure of updating radio wave environment information according to an exemplary embodiment of the present disclosure.

A method illustrated in FIG. 5 may be performed by, for example, the drone control apparatus 210 illustrated in FIGS. 2 and 3.

Referring to FIG. 5, the drone control apparatus 210 receives position information and signal quality information of the wireless communication network 400 from the flying drone 100 (510).

Then, the drone control apparatus 210 updates the radio wave environment information of the wireless communication network 400 according to the prestored spatial position using the received position information and the received signal quality information of the wireless communication network 400 (520).

Figure 6:
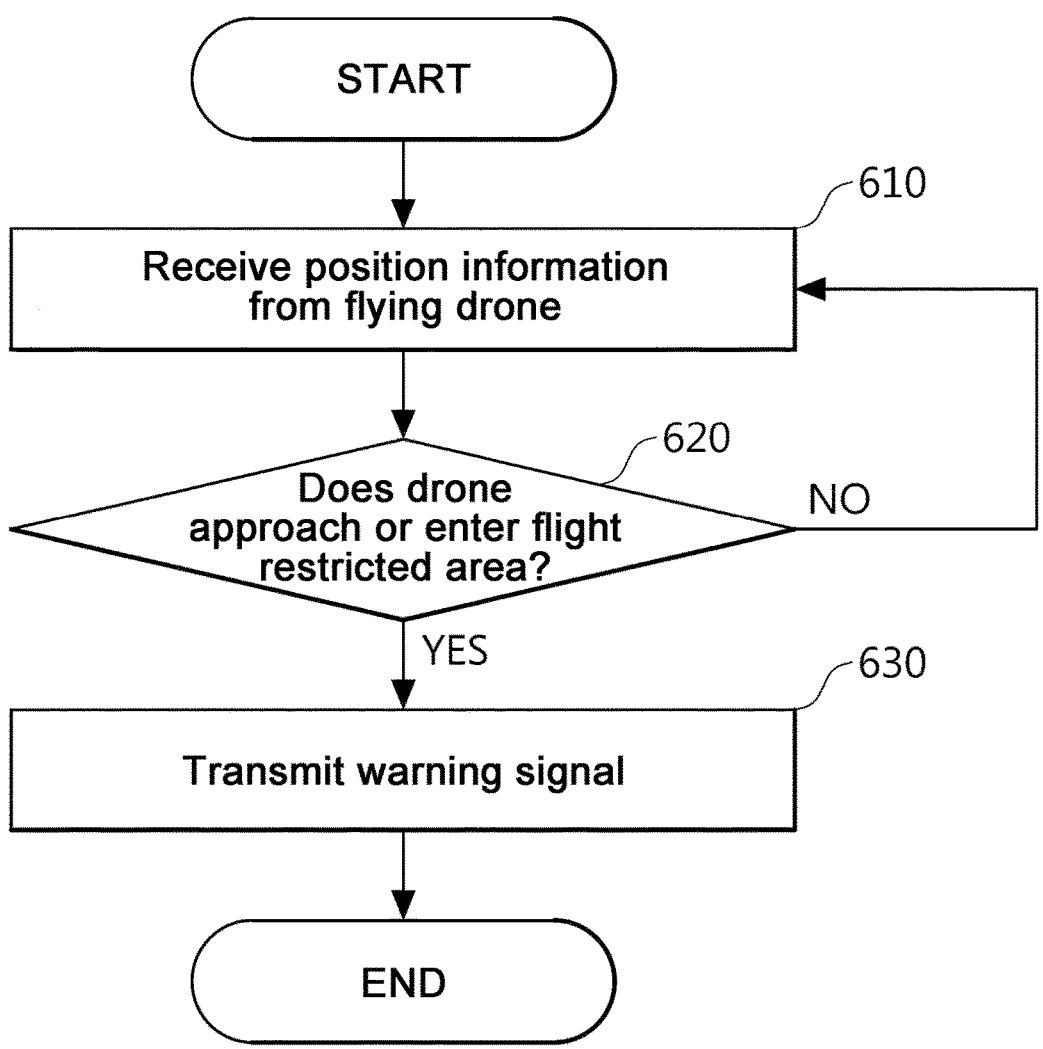
FIG. 6 is a flowchart illustrating a procedure of transmitting a warning signal according to an exemplary embodiment of the present disclosure.

FIG. 6 is a flowchart illustrating a procedure of transmitting a warning signal according to an exemplary embodiment of the present disclosure.

A method illustrated in FIG. 6 may be performed by, for example, the drone control apparatus 210 illustrated in FIG. 3.

Referring to FIG. 6, the drone control apparatus 210 receives the position information from the flying drone 100 over the wireless communication network 400 (610).

Then, the drone control apparatus 210 determines whether the flying drone 100 approaches or enters a flight restricted area based on the received position information and the prestored flight restriction information (620).

Then, when the drone control apparatus 210 determines whether the flying drone 100 approaches or enters an area within a certain distance from the flight restricted area, the drone control apparatus 210 transmits a warning signal to the drone operation system 300 to inform that the flying drone 100 approaches or enters the flight restricted area (630).

Figure 7:
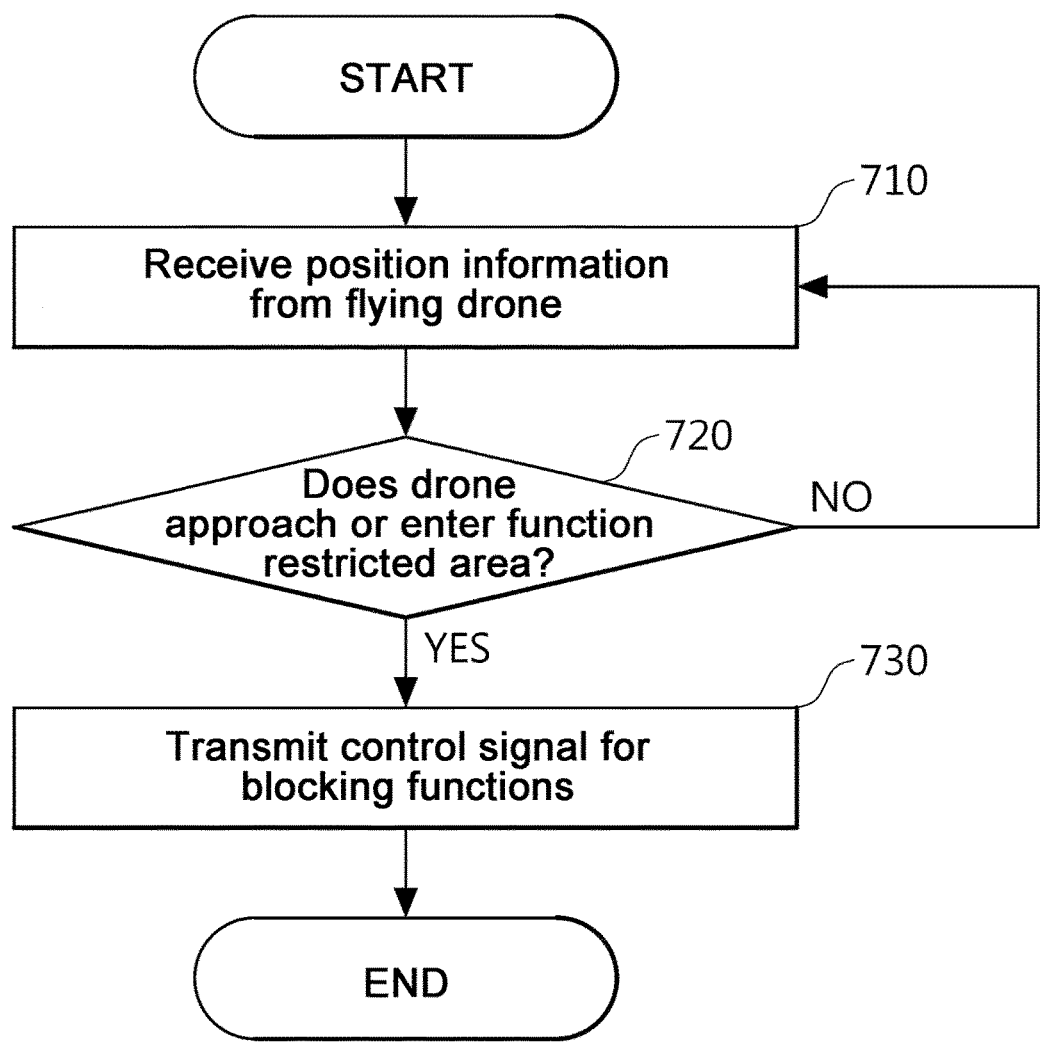
FIG. 7 is a flowchart illustrating a procedure of transmitting a control signal according to an exemplary embodiment of the present disclosure.

FIG. 7 is a flowchart illustrating a procedure of transmitting a control signal according to an exemplary embodiment of the present disclosure.

A method illustrated in FIG. 7 may be performed by, for example, the drone control apparatus 210 illustrated in FIG. 3.

Referring to FIG. 7, the drone control apparatus 210 receives the position information from the flying drone 100 over the wireless communication network 400 (710).

Then, the drone control apparatus 210 determines whether the flying drone 100 approaches or enters the function restricted area based on the received position information and the prestored flight restriction information (720).

Then, when the drone control apparatus 210 determines whether the flying drone 100 approaches or enters the function restricted area, the drone control apparatus 210 transmits a control signal for blocking functions of the drone 100 to the drone 100 (730).

Figure 8:
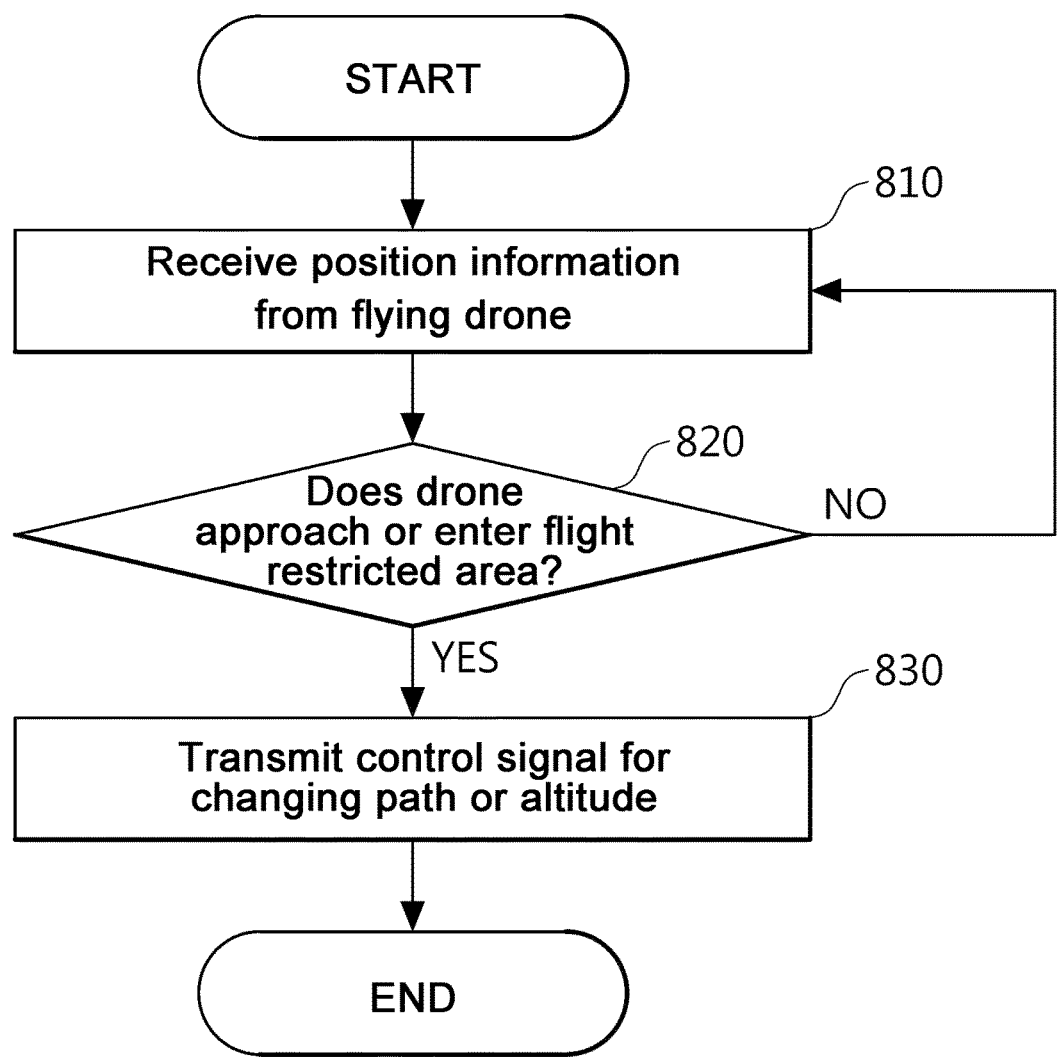
FIG. 8 is a flowchart illustrating a procedure of transmitting a control signal according to another exemplary embodiment of the present disclosure.

FIG. 8 is a flowchart illustrating a procedure of transmitting a control signal according to another exemplary embodiment of the present disclosure.

A method illustrated in FIG. 8 may be performed by, for example, the drone control apparatus 210 illustrated in FIG. 3.

Referring to FIG. 8, the drone control apparatus 210 receives the position information from the flying drone 100 over the wireless communication network 400 (810).

Then, the drone control apparatus 210 determines whether the flying drone 100 approaches or enters a flight restricted area based on the received position information and the prestored flight restriction information (820).

Then, when the drone control apparatus 210 determines whether the flying drone 100 approaches or enters an area within a certain distance from the flight restricted area, the drone control apparatus 210 transmits a control signal for changing the path or the altitude of the drone 100 to the drone 100 (830).

Meanwhile, while the above method has been described as a plurality of divided operations in the flowcharts illustrated in FIGS. 4 to 8, at least some of the operations may be performed in a changed order, performed in combination with other operations, omitted, performed as sub-operations, or performed with one or more additional operations that are not shown.

Meanwhile, the exemplary embodiments of the present disclosure may include a computer-readable recording medium including a program for performing the methods described herein on a computer. The computer-readable recording medium may include program instructions, a local data file, and a local data structure alone or in combination. The medium may be a medium particularly designed and configured for the purpose of the present disclosure or a medium usually available in the computer software field. Examples of the computer-readable recording medium include a magnetic medium such as a hard disk, a floppy disk, or a magnetic tape, an optical recording medium such as a CD-ROM or a DVD, a magneto-optical medium such as a floppy disc, and a hardware device particularly configured to store and perform program instructions such as a ROM, a RAM, or a flash memory. Examples of the program instructions may include machine code as created by a compiler, as well as a high level code that can be executed by a computer using an interpreter or the like.

The above-described devices may be implemented using hardware components and software components. For example, the above modules of drone control apparatus 210 may be implemented using hardware components. The hardware components may include a processor and a memory.

The processor may be a controller and an arithmetic logic unit, a digital signal processor, a microcomputer, a field programmable array, a programmable logic unit, a microprocessor or any other device capable of responding to and executing instructions in a defined manner such that the processor is programmed with instructions that configure the processing device as a special purpose computer configured to perform the embodiments of the present disclosure.

While the representative exemplary embodiments of the present disclosure have been described in detail, a person skilled in the art to which the present disclosure pertains will understand that several variations can be made to the exemplary embodiments without departing from the scope of the present disclosure. Therefore, the scope of the present disclosure should not be limited to the described exemplary embodiments, and should be determined by the claims to be described below and their equivalents.

What is claimed is:
1. A drone control apparatus, comprising:
a communicator configured to communicate with a drone operation system and a drone, over a wireless communication network;

a memory configured to store radio wave environment information of the wireless communication network and flight restriction information, the radio wave environment information indicating a quality of wireless signals of the wireless communication network at spatial locations corresponding to an altitude at a geographic location; and a processor configured to:
receive a departure location and a destination location of the drone from the drone operating system;
determine a flight path between the departure location and the destination location and flight altitude information for the drone along the flight path based on the radio wave environment information, the flight restriction information, the departure location, and the destination location;
transmit the flight path and the flight altitude information to at least one of the drone and the drone operation system via the communicator,
wherein the processor is further configured to determine, based on the radio wave environment information, the flight path and the flight altitude information such that a quality of the wireless communication network along the flight path exceeds a predetermined threshold generate control information to control the drone to fly along the flight path according to the flight altitude information based on position information received from the drone and the flight restriction information; and
transmit the control information to at least one of the drone and the drone operation system via the communicator,
wherein the processor is further configured to generate a warning signal, and transmit, based on the position information and the flight restriction information, the warning signal to the drone operation system in response to the drone approaching or entering a flight restriction area, and
wherein the processor is further configured to generate, based on the position information, a control signal to change at least one of a flight direction and a flight altitude of the drone in response to the drone approaching or entering the flight restricted area, and transmit the control signal to the drone.

2. The drone control apparatus according to claim 1, wherein the flight restriction information comprises information about at least one of:
the flight restricted area in which flight of the drone is restricted or prohibited, the flight restricted area comprising at least one of a restricted geographic area and a restricted elevation within the restricted geographic area, and
a function restricted area in which a function of the drone is restricted, the function restricted area comprising at least one of a function restricted geographic area and a function restricted elevation within the function restricted geographic area.

3. The drone control apparatus according to claim 2, wherein the processor is further configured to determine the flight path and the flight altitude information such that the quality of the wireless communication network along the flight path exceeds the predetermined threshold, and such that the flight path and the flight altitude circumvent the flight restricted area.

4. The drone control apparatus according to claim 1, wherein the processor is further configured to update the radio wave environment information based on the position information and signal quality information of the wireless communication network received from the drone.

5. The drone control apparatus according to claim 2, wherein the processor is further configured to:
generate a control signal to deactivate the function of the drone, and
transmit, based on the position information, the control signal to the drone in response to the drone approaching or entering the function restricted area.

6. A drone control method using a wireless communication network, comprising:
receiving, by a processor, a departure location and a destination location of a drone from a drone operation system;
determining, by the processor, a flight path between the departure location and the destination location and flight altitude information for the drone along the flight path, based on the departure location, the destination location, pre-stored radio wave environment information indicating a quality of wireless signals of the wireless communication network at spatial locations corresponding to an altitude at a geographic location, and pre-stored flight restriction information;
transmitting, by the processor, the flight path and the flight altitude information to at least one of the drone and the drone operation system,
wherein the determining the flight path and the flight altitude information for the drone comprises determining, by the processor, based on the pre-stored radio wave environment information, the flight path and the flight altitude information such that a quality of the wireless communication network along the flight path exceeds a predetermined threshold; receiving, by the processor, position information from the drone;
generating, by the processor, control information to control the drone to fly along the flight path according to the flight altitude information based on the position information and the pre-stored flight restriction information,
wherein the generating the control information comprises generating, by the processor, based on the position information and the pre-stored flight restriction information, a warning signal in response to the drone approaching or entering a flight restricted area, and
wherein the generating the control information comprises generating, by the processor, based on the position information, a control signal to change at least one of a flight direction and a flight altitude of the drone in response to the drone approaching or entering the flight restricted area; and
transmitting, by the processor, the control information to at least one of the drone and the drone operation system.

7. The drone control method according to claim 6, wherein the pre-stored flight restriction information comprises information about at least one of:
the flight restricted area in which flight of the drone is restricted or prohibited, the flight restricted area comprising at least one of a restricted geographic area and a restricted elevation within the restricted geographic area; and
a function restricted area in which a function of the drone is restricted, the function restricted area comprising at least one of a function restricted geographic area and a function restricted elevation within the function restricted geographic area.

8. The drone control method according to claim 7, wherein the determining the flight path and the flight altitude information for the drone comprises determining the flight path and the flight altitude information such that the quality of the wireless communication network along the flight path exceeds the predetermined threshold, and such that the flight path and the flight altitude circumvent the flight restricted area.

9. The drone control method according to claim 6, further comprising:
   receiving, from the drone, position information and signal quality information of the wireless communication network; and
   updating the pre-stored radio wave environment information based on the position information and the signal quality information.

10. The drone control method according to claim 7, wherein the generating the control information comprises generating, based on the position information, a control signal to deactivate the function of the flying drone in response to the drone approaching or entering the function restricted area.

11. A non-transitory computer-readable recording medium storing a computer program the computer program causing a computer to perform operations of:
   receiving a departure location and a destination location of a drone from a drone operation system;
   determining a flight path between the departure location and the destination location and flight altitude information for the drone along the flight path, based on the departure location, the destination location, pre-stored radio wave environment information indicating a quality of wireless signals of a wireless communication network at spatial locations corresponding to an altitude at a geographic location, and pre-stored flight restriction information;
   transmitting the flight path and the flight altitude information to at least one of the drone and the drone operation system,
   wherein the determining the flight path and the flight altitude information for the drone comprises determining, based on the pre-stored radio wave environment information, the flight path and the flight altitude information such that a quality of the wireless communication network along the flight path exceeds a predetermined threshold; receiving position information from the drone;
   generating control information to control the drone to fly along the flight path according to the flight altitude information based on the position information and the pre-stored flight restriction information,
   wherein the generating the control information comprises generating based on the position information and the pre-stored flight restriction information, a warning signal in response to the drone approaching or entering a flight restricted area, and
   wherein the generating the control information comprises generating based on the position information, a control signal to change at least one of a flight direction and a flight altitude of the drone in response to the drone approaching or entering the flight restricted area; and
   transmitting the control information to at least one of the drone and the drone operation system.

* * * * *